United States Patent
Li

(10) Patent No.: US 6,982,634 B2
(45) Date of Patent: Jan. 3, 2006

(54) METHOD AND APPARATUS FOR REDUCING BLIND SPOTS IN OBSTACLE DETECTION

(76) Inventor: Shih-Hsiung Li, 7F-5, No. 23, Sec. 1, Hangchow S. Rd., Taipei (TW)

( * ) Notice: Subject to any disclaimer, the term of this patent is extended or adjusted under 35 U.S.C. 154(b) by 288 days.

(21) Appl. No.: 10/289,363

(22) Filed: Nov. 7, 2002

(65) Prior Publication Data

US 2004/0090316 A1    May 13, 2004

(51) Int. Cl.
*B60Q 1/00* (2006.01)
(52) U.S. Cl. .................. 340/435; 340/539.1; 340/903; 340/625.25; 342/88
(58) Field of Classification Search ................ 340/435, 340/436, 539.1, 903, 425.5; 180/169, 167; 342/115, 189, 88; 343/713
See application file for complete search history.

(56) References Cited

U.S. PATENT DOCUMENTS

| 4,349,823 | A | * | 9/1982 | Tagami et al. ................. 342/70 |
| 4,467,313 | A | * | 8/1984 | Yoshino et al. ............. 340/904 |
| 5,574,426 | A | * | 11/1996 | Shisgal et al. ............... 340/435 |
| 6,215,415 | B1 | * | 4/2001 | Schroder .................. 340/932.2 |
| 6,307,622 | B1 | * | 10/2001 | Lewis ........................ 356/4.01 |
| 6,496,153 | B2 | * | 12/2002 | Boulesteix .................. 343/713 |

\* cited by examiner

*Primary Examiner*—Phung Nguyen
(74) *Attorney, Agent, or Firm*—Alan D. Kamrath; Nikolai & Mersereau, P.A.

(57) ABSTRACT

A method and apparatus for reducing blind spot in obstacle detection as a vehicle moves in reverse relate to widening the transmission angle on two sets of ultrasonic transducers located at the rear of the vehicle. Signal transmission and reception of these two transducers are operated by a transducer control circuit that uses a channel switching means to permit only one transducer to be in a transmission mode and one transducer to be in a reception mode at any given moment. At the same time, the control circuit shuts off ringing signals remaining in a predetermined time frame to avoid signal cross talk from the transmitting transducer to the receiver transducer, which would trigger false alarms.

14 Claims, 7 Drawing Sheets

METHOD AND APPARATUS FOR REDUCING BLIND SPOTS IN OBSTACLE DETECTION

BACKGROUND OF THE INVENTION

1. Field of the Invention

The present invention relates to a method and apparatus for reducing blind spots in obstacle detection when a vehicle is moving in reverse by making use of a channel switching means and appropriate control of signal transmission time.

2. Description of Related Arts

A conventional rear transducer is activated when the vehicle moves in reverse to search for any obstacles and informs the driver how close the vehicle is to the obstacle by an electronic detection process. The warning system is implemented by setting up multiple predetermined threshold values that will be compared with the distance measured from the transducer to an obstacle. The transducer then sounds an alarm at different frequencies to inform drivers of the actual distance from an obstacle. When the vehicle is very close to the obstacle or in imminent danger of collision with the obstacle, the transducer uses a short and rapid beeping sound to warn drivers.

With reference to FIG. 4, the transducer generally installed on the rear end of a vehicle emits ultrasonic signals radiating outward in a fan pattern. The ranges for ideal detection are divided into multiple zones, where the closest distance (a1) from either Transducer A or Transducer B to an obstacle falls in the first zone, and the next closest (a2) and third to closest distances (a3) fall in a second zone and third zone respectively, and the longest distance (a4) falls in a fourth zone.

Ultrasonic signals emitted from the transducers do not travel in straight lines but in waves, and the signals fan out from the transmission source. When an obstacle is detected in the overlapping region (b1) or in the outer corner of the fan-out range (b2), the transducer will probably mistakenly sense that the obstacle is in the second zone (a2) from the vehicle. Thus incorrect information will be provided to the driver with regard to the actual location of the obstacle. When an obstacle is located between two transducers and inside the overlapping beams of a region (b1), in other words not detected by either transducer, the obstacle is in a "blind spot" and will be completely undetected by the transducers.

Serious problems in obstacle detection have arisen when a vehicle is moving in reverse, especially when an obstacle is located in the first zone (a1). Any error in or failure of the transducer detection could lead to serious personal injuries or property damage. To avoid such mishaps, blind spots (b1, b2, and b3) must be reduced to an insignificant proportion in the whole detection range. With reference to FIG. 5, modifying the detection pattern of a transducer from a fan shape to a somewhat oval shape will reduce the proportion of blind spots in the detection range considerably. Therefore, the chance of erroneous and missed detection can be cut down.

With reference to FIG. 6, the detection pattern of a vehicle transducer is fan shaped. Transducer A sends out ultrasonic signals and receives the same echoed signals back from an obstacle. Then, Transducer B sends out ultrasonic signals and also receives the same echoed signals back. The transducer control circuit receives the echoed signals and records the time from the transmission of the signals to the reception of signals echoed back from an obstacle. The elapsed time is then used to calculate the closest distance between an obstacle and the vehicle. Transducer B follows the same process to emit signals and receive signals returned from an obstacle. The transmission durations for signals to travel from the transducers to an obstacle and return to the transducers are respectively recorded for calculation of the closest distance between the transducers and the obstacle. For reference, the transmission speed of ultrasonic waves through the air is 340 m/s. When the transducer overlap region (b1) is being scanned, Transducer A emits ultrasonic signals and later receives the same signals reflected from an obstacle, and then Transducer B emits signals and receives the echoed signals. The duration for signal transmission for both transducers are recorded for calculation of the closest distance from any transducer to an obstacle. Since a rear transducer cannot cover region b3, the area in region b3 must be reduced if the transducer is to maintain high accuracy in obstacle detection.

SUMMARY OF THE INVENTION

The main object of the present invention is to provide a method that can effectively reduce blind spots in the detection pattern as a vehicle moves in reverse. The apparatus in accordance with the invention comprises a transducer with a wider transmission angle as compared with conventional transducers.

With reference to FIGS. 7A and B, ultrasonic signals do not travel in a straight line but rather in waves radiating outwardly. A transducer with a wider transmission angle (FIG. 7B) has a much smaller blind spot (b3) than the blind spot (b3) with conventional transducers (FIG. 7A) that have a narrower transmission angle. In other words, the size of the blind spot (b3) can be effectively controlled by careful selection of transducers with a wide transmission angle.

The secondary object of the invention is to provide an ultrasonic transducer that can prevent erroneous triggering of warning signals.

When the size of the blind spot has been reduced to an insignificant proportion of the area covered, signals from Transducer A can be transmitted directly into Transducer B in a receive mode, which could cause erroneous triggering of warning signals. If the closest distance between Transducer A and Transducer B is n cm, and the transmission speed of ultrasonic waves through the air is 340 m/s, then a signal travelling from Transducer A to Transducer B will take $t_n$ sec ($t_n=n/34$). Based on the characteristics of a triangle, the sum of any two sides of a triangle is always greater than the length of the third side. Therefore the time for a signal to travel from Transducer A to an obstacle and to Transducer B must be greater than $t_n$.

Consequently, with the vehicle moving in reverse, Transducer A in the transmission mode and Transducer B in the reception mode, Transducer B can be set to receive ultrasonic signals only after a signal transmission duration $t_n$. Thus, signals with a transmission duration less than $t_n$ can be ignored. A transducer control circuit would then be able to calculate the closest distance from Transducer B to an obstacle using the recorded duration for signal transmission.

With reference to FIG. 8, if the distance from the obstacle to Transducer A is x, and the distance to Transducer B is y, the sum of distance from any point in the region (b4) to Transducer A and Transducer B should be less than or equal to x+y, based on the characteristics of an oval-shaped polygon. For example, if Transducer A is in the transmission mode and Transducer B is in the reception mode, the distance from the transducer to the obstacle is m, and the distance from Transducer A to Transducer B in a straight line is k. When the transducer calculates the distance of an obstacle from the vehicle to be k<m<x+y, it can be determined that the obstacle is located in the first zone. Using the present distance calculation model, the accuracy in obstacle detection can be enhanced significantly.

Another objective of the present invention is to provide a transducer control circuit that is capable of reducing blind spots in obstacle detection, comprising a central processing unit, an alarm control circuit, a voltage booster circuit, a channel switching unit and a signal amplifier. The central processing unit is formed by a single chip and other peripheral components, generates pulses with predetermined frequencies, computes the closest distance from the transducer to an obstacle, activates the alarm and selects the active channel for signal reception. The alarm control circuit is formed with a buzzer and is operated by the central processing unit. The alarm control circuit is used to generate audible warnings at different frequencies to indicate the actual distance from an obstacle. The voltage booster circuit steps up the output voltage from the central processing unit and passes the signal to the ultrasonic transducer for signal transmission. The channel switching unit is operated by the central processing unit and selects a channel to receive echoed signals generated from a particular transducer. The signal amplifier amplifies echoed signals through the channel-switching unit and then passes on the amplified signals to the central processing unit.

During operation, the central processing unit first orders the ultrasonic transducer to transmit signals at 40 kHz frequency, and after stray signals die out, the central processing unit starts to record echoed signals. When the transmitted signals strike an obstacle, part of the signals will be reflected to the transducer so the control circuit only needs to record the duration used for a signal to travel from the transmitter until it returns to the receiver. The central processing unit then calculates the distance from the obstacle by plugging in the signal transmission speed, where the normal transmission speed through the air is 340 m/s.

The transducers output ultrasonic signals sequentially and receive the returned signals in the same order under the control of the central processing unit so that there is only one transducer in the transmission mode and one transducer in the reception mode at any given instant. After receiving the echoed signals through the channel selector, the transducer passes the received signals to the signal amplifier.

The features and structure of the present invention will be more clearly understood when taken in conjunction with the accompanying figures.

DETAILED DESCRIPTION OF THE PREFERRED EMBODIMENT

Figure 1:
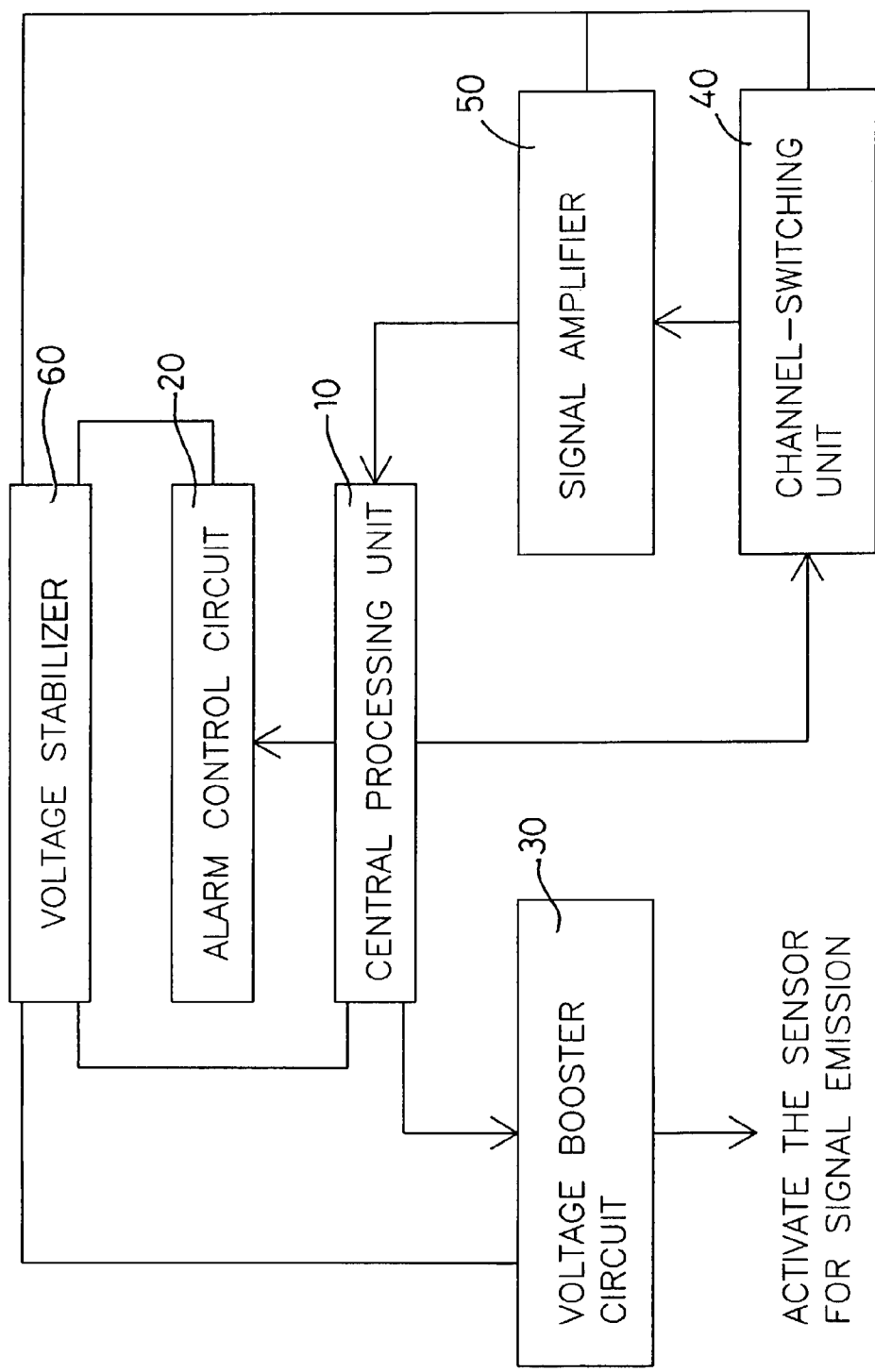
FIG. 1 is a functional block diagram of the apparatus in accordance with the present invention.

With reference to FIG. 1, a modified transducer in accordance with the present invention that is capable of reducing blind spots in object detection comprises a central processing unit (10), an alarm control circuit (20), and a voltage booster circuit (30), a channel switching unit (40), a signal amplifier (50) and a voltage stabilizer (60). The central processing unit (10), composed of a main chip and other peripheral components generates pulses with predetermined frequencies, computes the closest distance from an obstacle to the transducer, activates the warning alarm and selects a channel for signal reception from a particular transducer. The alarm control circuit (20) formed with a buzzer is controlled by the central processing unit (10) and generates audible warnings at different frequencies to indicate the distance from an obstacle. The voltage booster circuit (30) steps up the pulse voltage output from the central processing unit (10), and the output is coupled to the ultrasonic transducer for signal transmission. The channel switching unit (40), under the control of the central processing unit (10), selects an appropriate channel associated with a particular transducer for reception of echoed signals. The signal amplifier (50) amplifies echoed signals received through the channel switching unit (40) and then passes on the amplified signals to the central processing unit (10).

Figure 2A:
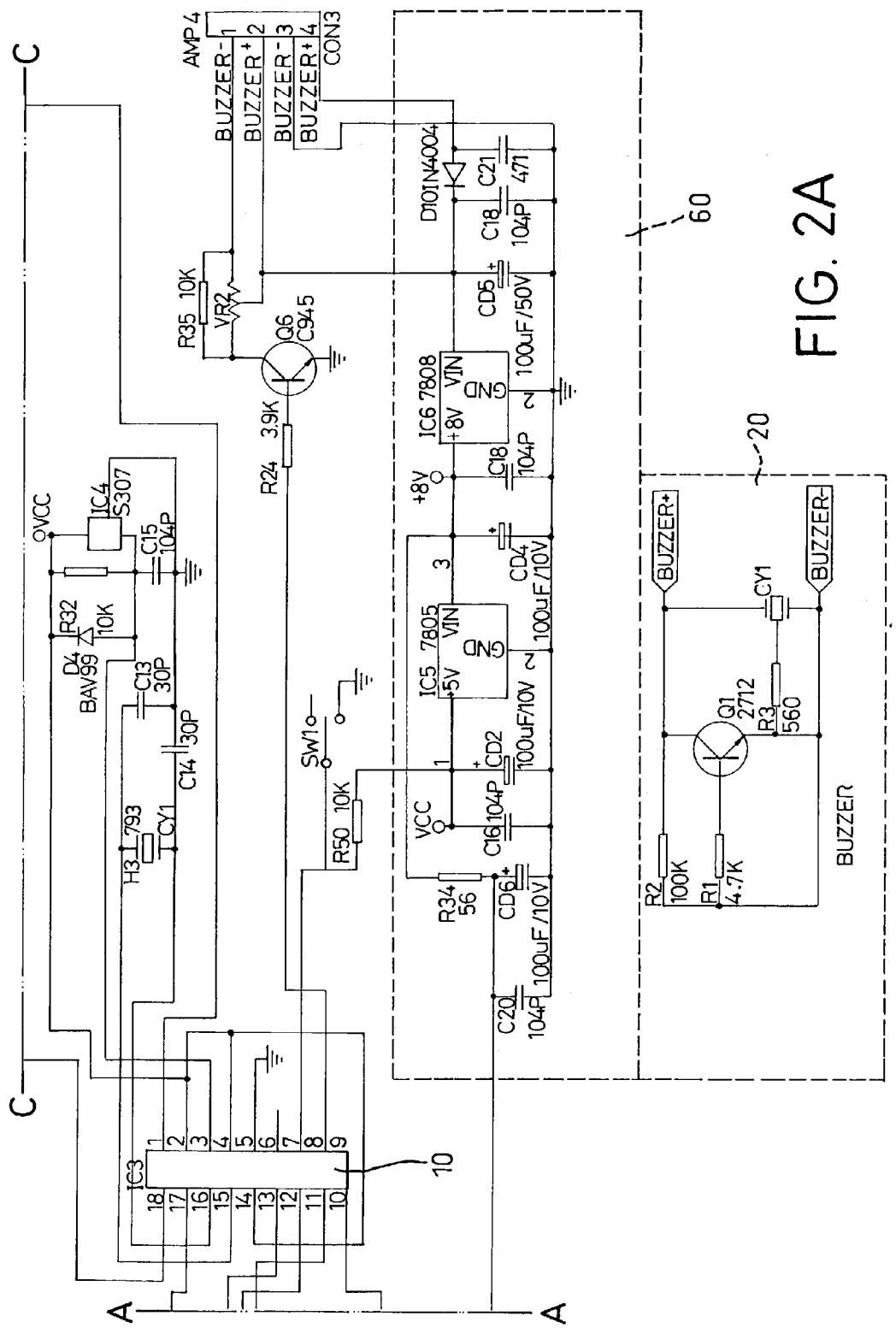
FIGS. 2A–2C are detailed circuit diagrams of the apparatus in FIG. 1.
Figure 2B:
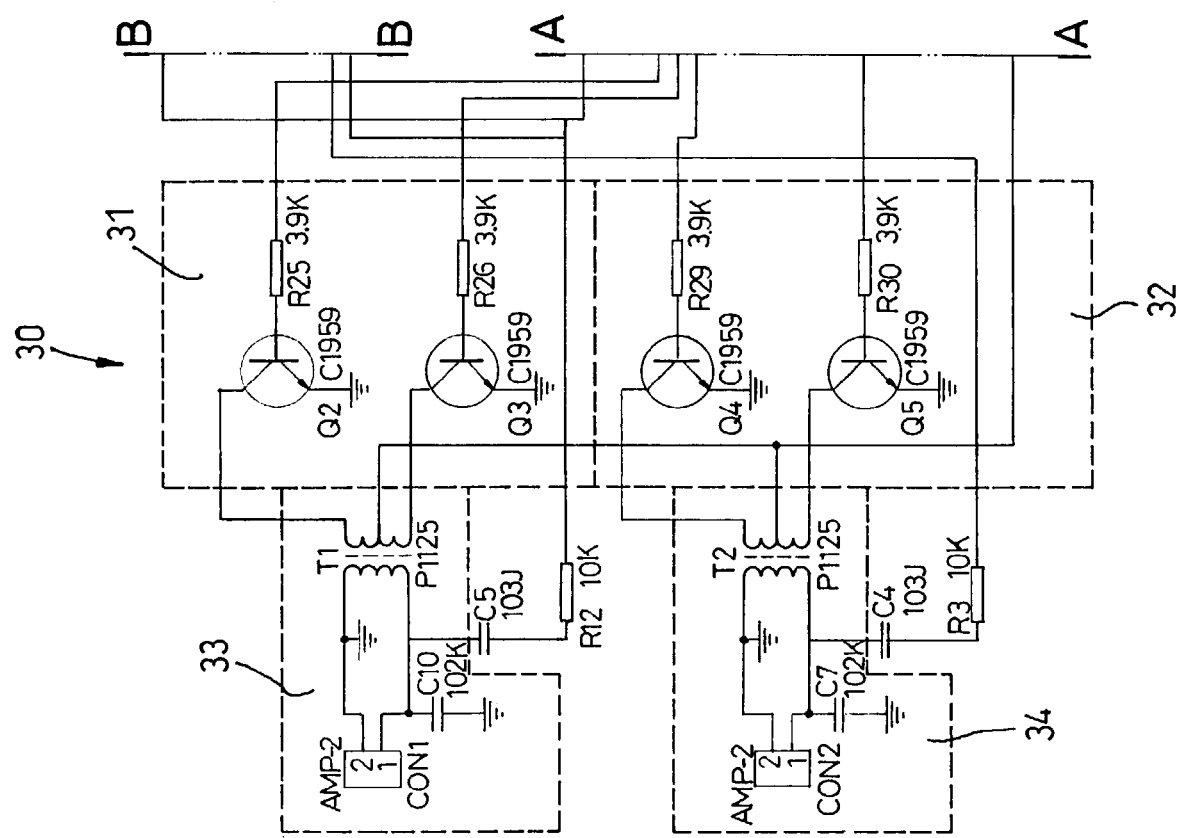
Figure 2C:
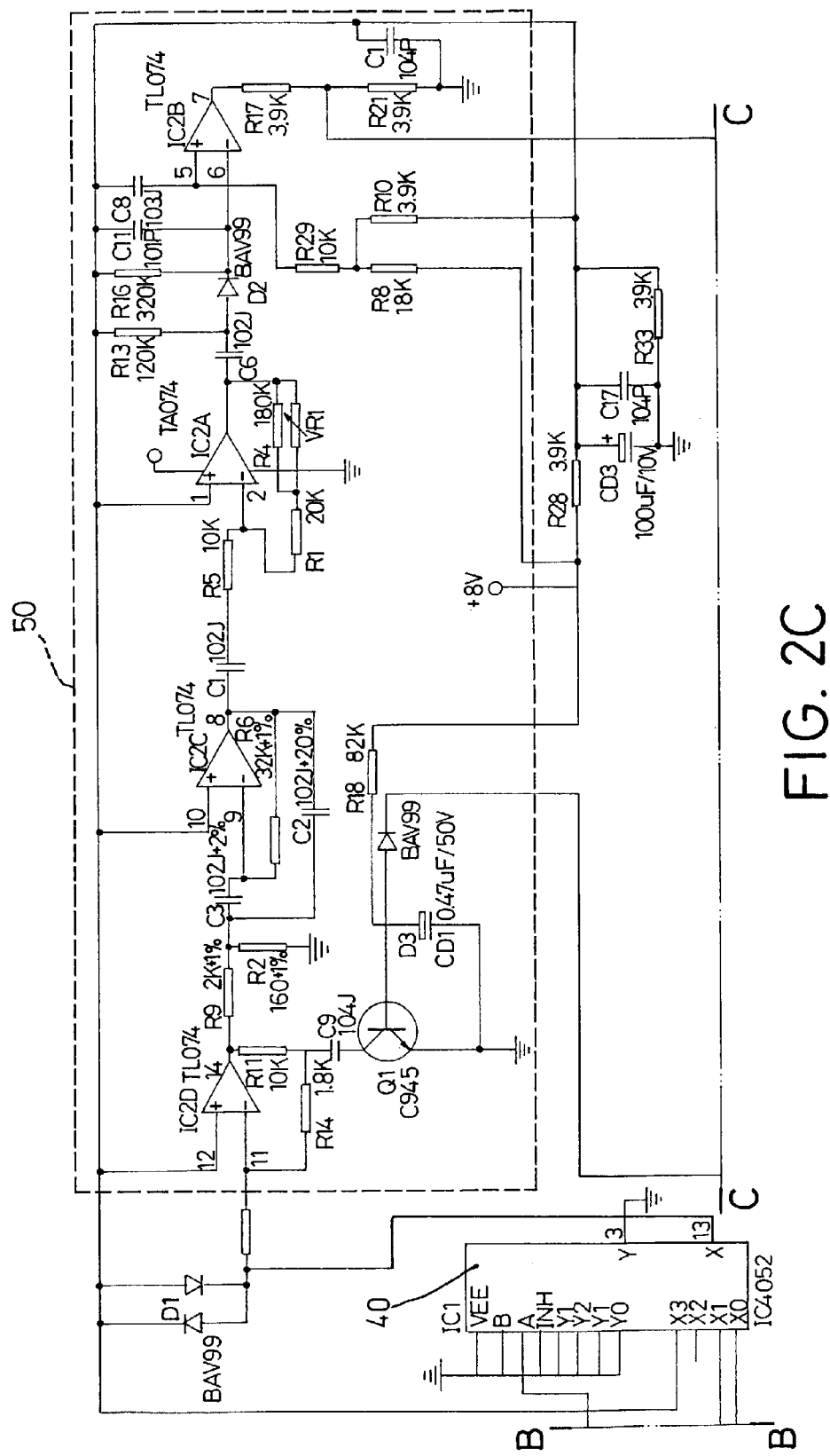
Figure 3:
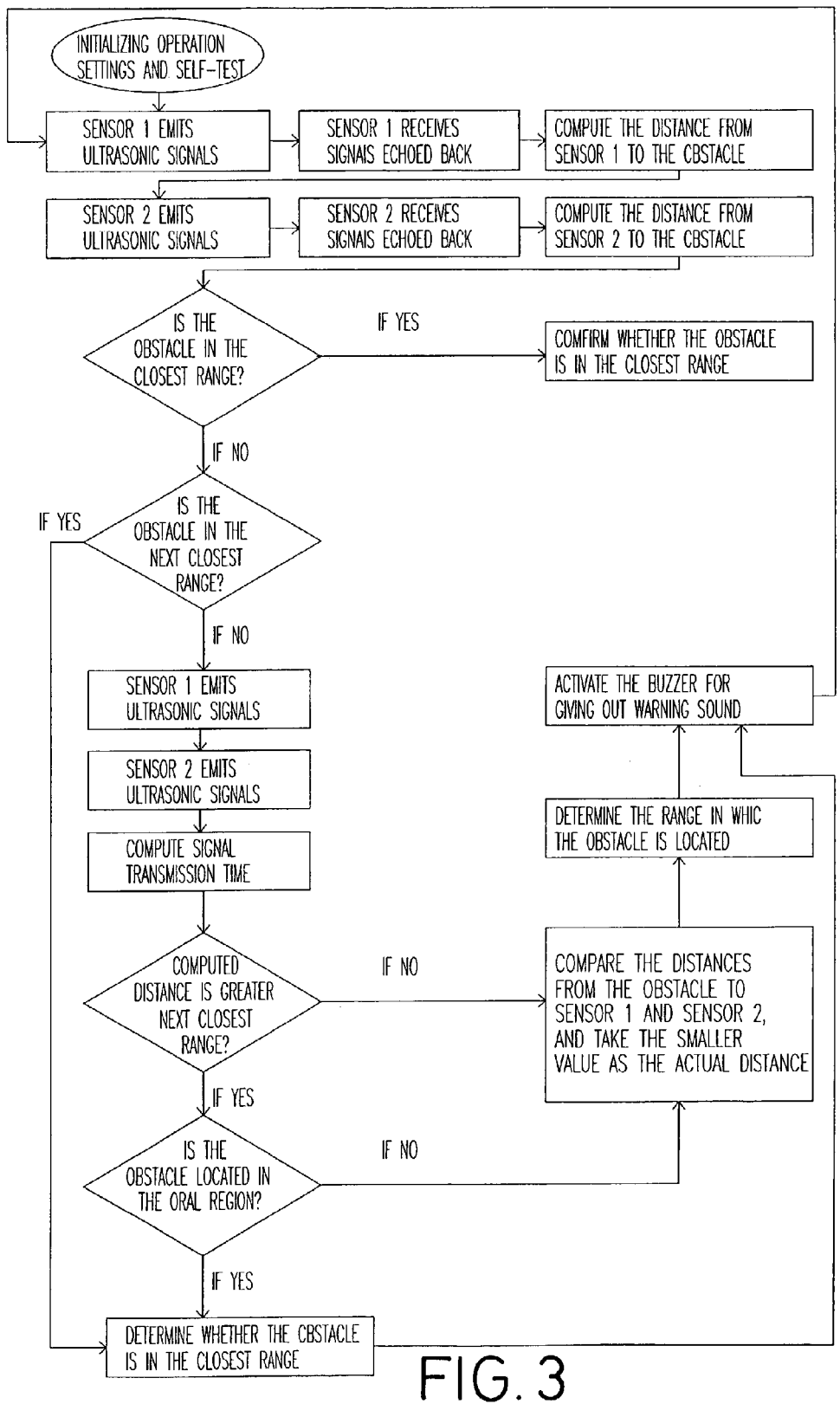
FIG. 3 is a logic diagram of the operation of the apparatus in FIG. 1.
Figure 4:
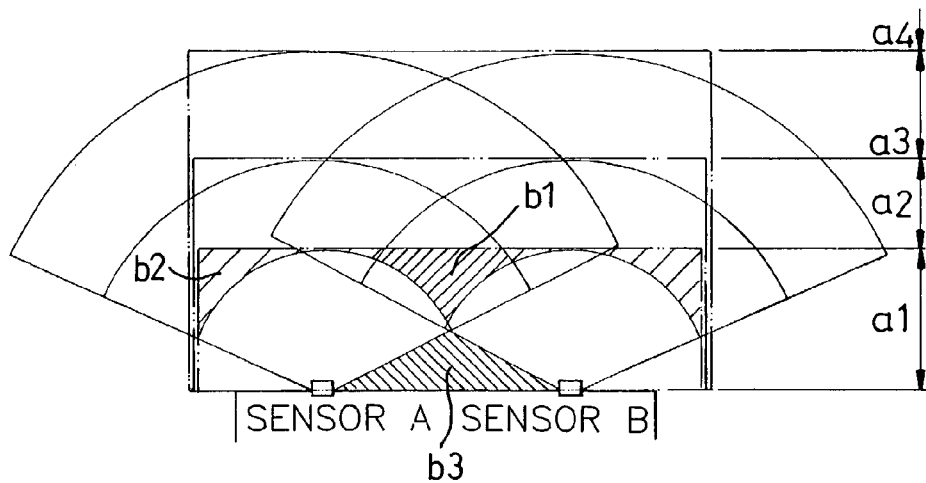
FIG. 4 is a signal pattern and detection diagram of a conventional rear transducer.
Figure 5:
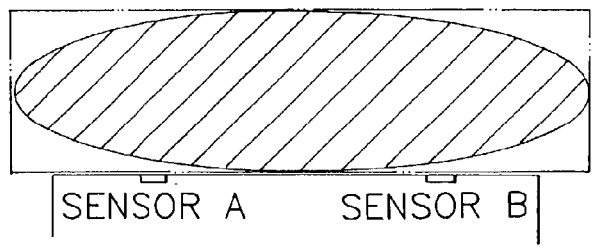
FIG. 5 is a signal transmission pattern of a modified rear transducer.
Figure 6:
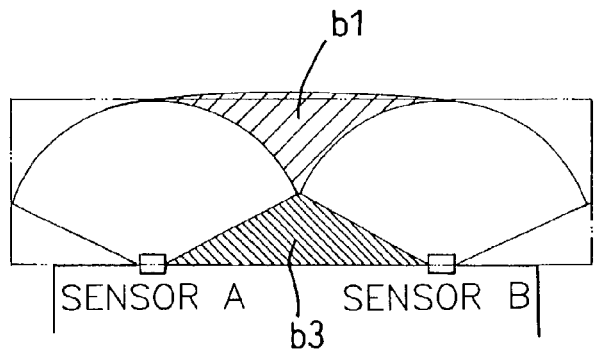
FIG. 6 is a signal pattern diagram depicting the blind spot in obstacle detection from a conventional rear transducer.

With further reference to FIGS. 2A, 2B and 2C, the hub of the control circuit is a central processing unit (10) that can generate square waves of 40 kHz+/–0.5%. The CPU in the current embodiment is a PIC16C54 chip from Microchip, operating at a clock frequency of 3.798 MHz. The transducer control circuit includes an external oscillator and a voltage regulating circuit. The external oscillator circuit is composed of two capacitors (C13, C14) and an oscillator (CY1). The voltage regulating circuit is composed of a voltage detector (IC4), a capacitor (C15) and a resistor (R32) and a diode (D4) in parallel. The voltage detector (IC4) detects changes in source voltage and sends voltage control signals to the voltage regulating pin of the central processing unit (10) to solve the problem of poor voltage regulation when the power switch is quickly switched on and off.

Pins 10, 11, 12 and 13 of the central processing unit (10) generate 40 kHz square waves that are passed to the voltage booster circuit (30) for signal amplification. Pin 17 of the central processing unit (10) is used to control the operation of the channel switching circuit (40) through an electronic switch (IC1). The channel switching unit (40) selects an appropriate channel in association with a particular transducer to receive echoed signals that will then be passed to the signal amplifier (50) for signal amplification. Pin 18 of the central processing unit (10) is used to set the amplification factor for the signal amplifier (50). The signal amplifier (50) is designed to suppress ringing signals from other transducers. Pin 1 of the central processing unit (10) receives the amplified signals from the signal amplifier (50). Pin 8 of the central processing unit (10) activates the switch controlling the buzzer of the alarm control circuit (20) that is composed of a resistor (R24), a transistor (Q6), another resistor (R35) and a variable resistor (VR2).

The voltage booster circuit (30) is composed of two sets of voltage boosters (31, 32). Each set (31, 32) is formed by a pair of transistors (Q2–Q3, Q4–Q5) and a pair of resistors (R25–R26, R29–R30) which boost the voltage level of the 40 kHz square waves having complementary phase angles.

To transmit through the first transducer, the square waves are transmitted through a transmitter circuit (33) made up of a transformer (T1), a capacitor (C10) and a connector (CON1) to the first transducer. Echoed signals from the first transducer are later received by a reception circuit of the first transducer. The reception circuit of the first transducer is composed of a capacitor (C5) and a resistor (R12). The echoed signals are passed to the channel switching unit (40) that sets up a channel for signal reception from a particular transducer, and the received signals are then passed to the signal amplifier (50).

Signals are transmitted and received through the second transducer by the same operation procedures. A voltage booster (32) corresponding to the second transducer is formed by a pair of transistors (Q4, Q5) and a pair of resistors (R29, R30). The voltage booster (32) is connected to a transformer (T2) and a capacitor (C7) that form the signal transmitter circuit (34) corresponding to the second transducer. A capacitor (C4) and a resistor (R3) form the signal detector for the second transducer. The second transducer transmits and receives signals through a connector (CON2). The channel switching unit (40) controlled by the central processing unit (10) selectively passes echoed signals from first and second transducers to the signal amplifier (50). The control logic for the channel switching unit (40) is listed below, where A and B represent control inputs into the channel switching unit (40):

| Input A | Input B | I/O connection status |
|---------|---------|----------------------|
| 0 | 0 | X and X0 connected |
| 1 | 0 | X and X1 connected. |

The signal amplifier (50) is composed of first, second, third and fourth stage op-amps (IC2D, IC2C, IC2A, IC2B) and a four-stage signal amplifier formed by the peripheral circuit and are used to amplify weak echoed signals received by the transducers. After amplification, the signals are passed to the central processing unit (10) for distance computation.

Pin 18 of the central processing unit (10) is used to suppress ringing signals through the control circuit diode (D3) and transistor (Q1). When the output voltage from pin 18 is at low level, the transistor (Q1) is disabled causing the decrease of amplification factor of the first stage op-amp (IC2D), thus suppressing ringing signals from the previous transmit mode. However, when the voltage output from pin 18 is at a high level, the amplification factor of the first stage op-amp (IC2D) will be increased, thus amplifying the echoed signals to an appropriate level.

The voltage stabilizer (60) provides stable+5V and+12V power to the central control circuit. The voltage stabilizer (60) is formed by a diode (D10), regulator ICs (IC5, IC6) and various resistors and capacitors.

When a vehicle shifts into reverse, the rear transducer is activated. The central processing unit (10) is enabled for self-test with two "teak" sounds from the buzzer indicating that the rear transducer is ready for self-test to detect any remaining ringing signals on each transducer.

After finishing the self-test procedure, the first transducer emits an ultrasonic signal and thereafter detects signals echoed from any obstacles. The central processing unit then uses a signal transmission duration from the point of signal transmission from the first transducer to signal reception by the same transducer to calculate the closest distance from the first transducer to the obstacle. Each transducer toggles either from transmit mode to receive mode or vice versa after a certain time, which has to be long enough to filter out stray signals. For the current embodiment, transducer toggles between transmit and receive modes every 50 msec. The second transducer next in turn emits an ultrasonic signal and detects signals just like the first transducer. The second signal transmission duration is also recorded for calculating the closest distance from the second transducer to the obstacle.

Based on the conventional application of ranging techniques, minimum detection range ($d_{min}$) can be expressed by the formula i.e. $d_{min}=(t_{pulse} \times v_{pulse})/2$, where $t_{pulse}$ stands for the duration of transmitted pulse and $v_{pulse}$ for the signal transmission speed. The maximum detection distance is determined by the pulse repetition frequency (PRF).

If the distance calculated for either the first transducer or the second transducer is below the predetermined threshold, the control circuit immediately issues a warning indication by triggering the buzzer to warn of imminent collision with the obstacle.

Figure 8:
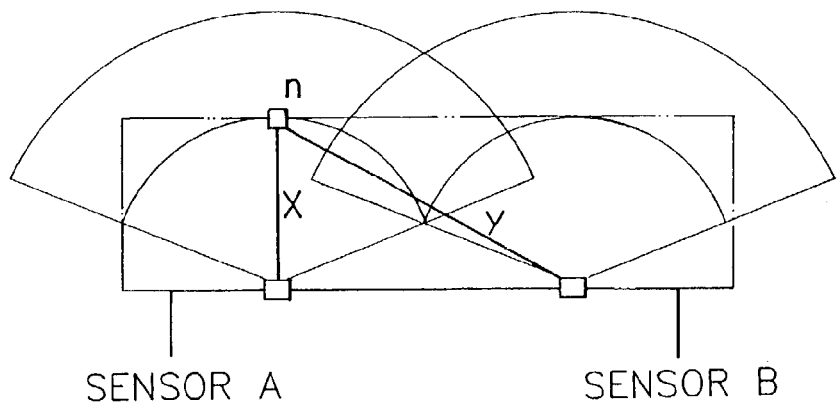
FIG. 8 is a signal pattern diagram showing the detection range of a rear transducer.

If the distances calculated for both the first transducer and the second transducer are above the predetermined threshold, the control circuit calculates the closest distance from the obstacle to the closest transducer. If the calculated distance is greater than the straight line distance between the first transducer and the second transducer, but less than the predetermined value (x+y), where X is the minimum distance to the outer edge of the area (a1) indicated from Sensor A, and Y is the corresponding distance from Sensor B (refer to FIG. 8 for illustration). The control circuit thereby determines that an obstacle is located in the closest range (a1) and immediately issues an alarm through the buzzer. Otherwise, the control circuit further compares the values associated with the two transducers, and takes the smallest value as the actual distance. This actual distance is compared with each threshold value in various ranges to determine the location of the obstacle, and the warning buzzer is sounded with a frequency in inverse relation to the distance from the obstacle. The process mentioned above is repeated until the transducer circuit is turned off.

Figure 7A:
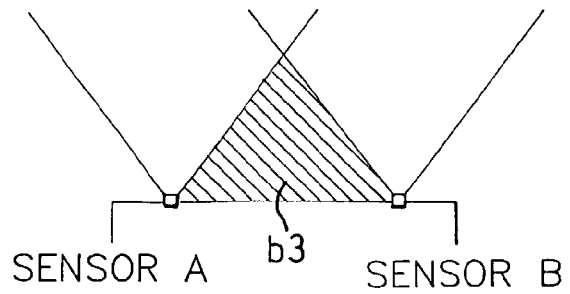
FIGS. 7A and 7B are signal pattern diagrams showing the blind spot as a result of changes in transmission angle.
Figure 7B:
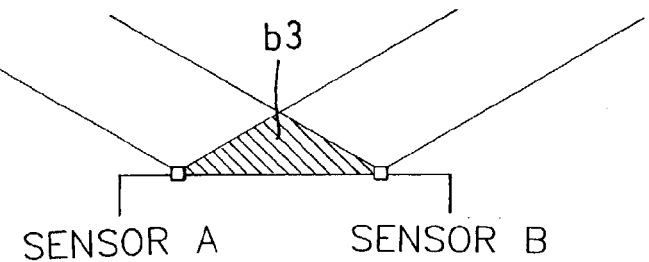

From the foregoing, the present invention clearly utilizes the central processing unit (10) as the hub of the control circuit for obstacle detection and chooses a transducer with a wide transmission angle as shown in FIG. 7B. Thus, the blind spot in the transducer detection range can be reduced.

Furthermore, according to the design of logic, the present invention permits only one transducer to be engaged in active transmission mode at any given moment and one transducer in reception mode at any given moment, ignoring all ringing signals remaining in the predetermined time frame. Previous blind spots in obstacle detection can be reduced considerably, and the detection accuracy can be enhanced.

The foregoing description of the preferred embodiments of the present invention is intended to be illustrative only and, under no circumstances, should the scope of the present invention be so restricted.

What is claimed is:

1. A method for reducing blind spots in obstacle detection as a vehicle moves in reverse comprising the steps of:
   setting up of two transducers with a wide transmission angle at the rear of the vehicle; and
   adoption of channel switching means to allow only one transducer to be in a transmission mode and one transducer to be in a reception mode, while ignoring all ringing signals remaining in a predetermined time frame to prevent cross talk of signals and false triggering of an alarm;

wherein the predetermined time (t) is equal to the closest distance between the two transducers divided by a transmission speed of ultrasonic signals in the air.

2. An apparatus for reducing blind spots in obstacle detection as a vehicle moves in reverse, comprising:
- a central processing unit, composed of a main chip and other peripheral components, for generating pulses with predetermined frequencies, computing a closest distance from an obstacle, activating a warning alarm and selecting an active channel for signal reception from a particular transducer;
- an alarm control circuit for generating different tones to indicate the distance to the obstacle;
- a voltage booster circuit for increasing the pulse voltage output from the central processing unit in preparation for signal transmission by the transducers;
- a channel switching unit, under the control of the central processing unit, for selecting an active channel to receive echoed signals originated from a particular transducer; and
- a signal amplifier for amplifying a signal received through the channel switching unit before passing the signal to the central processing unit, wherein the central processing unit is connected to an external oscillator and a voltage regulating circuit which together forms a central control circuit.

3. The apparatus for reducing blind spots in obstacle detection as a vehicle moves in reverse as claimed in claim 2, wherein the alarm control circuit comprises a buzzer, which increases alarm frequency as the vehicle approaches the obstacle.

4. The apparatus for reducing blind spots in obstacle detection as a vehicle moves in reverse as claimed in claim 2, wherein the voltage booster circuit is formed from two voltage level boosters, wherein each is implemented by a pair of transistors and a pair of resistors for stepping up the voltage level of square waves with complementary phase angle before passing the waves to transmission circuits of two transducers.

5. The apparatus for reducing blind spots in obstacle detection as a vehicle moves in reverse as claimed in claim 4, wherein the transmission circuit of each transducer is formed with a transformer, a capacitor and an ultrasonic signal detector.

6. The apparatus for reducing blind spots in obstacle detection as a vehicle moves in reverse as claimed in claim 5, wherein the alarm control circuit comprises a buzzer, which increases alarm frequency as the vehicle approaches the obstacle.

7. The apparatus for reducing blind spots in obstacle detection as a vehicle moves in reverse as claimed in claim 5, wherein inputs of the channel switching unit are respectively connected to two reception circuits, and outputs of the channel switching unit are connected to a signal amplifier having four-stage amplification capabilities.

8. The apparatus for reducing blind spots in obstacle detection as a vehicle moves in reverse as claimed in claim 7, wherein the alarm control circuit comprises a buzzer, which increases alarm frequency as the vehicle approaches the obstacle.

9. An apparatus for reducing blind spots in obstacle detection as a vehicle moves in reverse, comprising:
- a central processing unit, composed of a main chin and other peripheral components, for generating pulses with predetermined frequencies, computing a closest distance from an obstacle, activating a warning alarm and selecting an active channel for signal reception from a particular transducer;
- an alarm control circuit for generating different tones to indicate the distance to the obstacle;
- a voltage booster circuit for increasing the pulse voltage output from the central processing unit in preparation for signal transmission by the transducers;
- a channel switching unit under the control of the central processing unit, for selecting an active channel to receive echoed signals originated from a particular transducer; and
- a signal amplifier for amplifying a signal received through the channel switching unit before passing the signal to the central processing unit, wherein the voltage booster circuit is formed from two voltage level boosters, wherein each is implemented by a pair of transistors and a pair of resistors for stepping up the voltage level of square waves with complementary phase angle before passing the waves to transmission circuits of two transducers.

10. The apparatus for reducing blind spots in obstacle detection as a vehicle moves in reverse as claimed in claim 9, wherein the transmission circuit of each transducer is formed with a transformer, a capacitor and an ultrasonic signal detector.

11. The apparatus for reducing blind spots in obstacle detection as a vehicle moves in reverse as claimed in claim 10, wherein inputs of the channel switching unit are respectively connected to two reception circuits, and outputs of the channel switching unit are connected to a signal amplifier having four-stage amplification capabilities.

12. The apparatus for reducing blind spots in obstacle detection as a vehicle moves in reverse as claimed in claim 11, wherein the alarm control circuit comprises a buzzer, which increases alarm frequency as the vehicle approaches the obstacle.

13. The apparatus for reducing blind spots in obstacle detection as a vehicle moves in reverse as claimed in claim 9 wherein the alarm control circuit comprises a buzzer, which increases alarm frequency as the vehicle approaches the obstacle.

14. The apparatus for reducing blind spots in obstacle detection as a vehicle moves in reverse as claimed in claim 10, wherein the alarm control circuit comprises a buzzer, which increases alarm frequency as the vehicle approaches the obstacle.

* * * * *